(12) United States Patent
Picard et al.

(10) Patent No.: US 9,323,976 B2
(45) Date of Patent: Apr. 26, 2016

(54) ANTI-FRAUD DEVICE

(71) Applicant: MORPHO, Issy-les-Moulineux (FR)

(72) Inventors: Sylvaine Picard, Issy-les-Moulineaux (FR); Alain Thiebot, Issy-les-Moulineaux (FR)

(73) Assignee: MORPHO, Issy-les-Moulineux (FR)

( * ) Notice: Subject to any disclaimer, the term of this patent is extended or adjusted under 35 U.S.C. 154(b) by 0 days.

(21) Appl. No.: 14/354,263

(22) PCT Filed: Oct. 23, 2012

(86) PCT No.: PCT/EP2012/070973
§ 371 (c)(1),
(2) Date: Apr. 25, 2014

(87) PCT Pub. No.: WO2013/060681
PCT Pub. Date: May 2, 2013

(65) Prior Publication Data
US 2014/0301616 A1   Oct. 9, 2014

(30) Foreign Application Priority Data
Oct. 25, 2011 (FR) .................... 11 59678

(51) Int. Cl.
*G06K 9/00* (2006.01)
(52) U.S. Cl.
CPC .......... *G06K 9/00114* (2013.01); *G06K 9/0008* (2013.01); *G06K 9/00107* (2013.01)
(58) Field of Classification Search
CPC .......... G06K 9/00067; G06K 9/00073; G06K 9/0008; G06K 9/001; G06K 9/00107
See application file for complete search history.

(56) References Cited

U.S. PATENT DOCUMENTS

| 7,116,805 B2* | 10/2006 | Machida ................ 382/124 |
| 2004/0125994 A1 | 7/2004 | Engels |
| 2005/0105782 A1* | 5/2005 | Abiko .................... 382/124 |
| 2009/0316963 A1 | 12/2009 | Boshra |

FOREIGN PATENT DOCUMENTS

FR    2 862 785    5/2005

OTHER PUBLICATIONS

Translation of the Written Opinion of the International Searching Authority for PCT/EP2012/070973, 11 pages.
(Continued)

*Primary Examiner* — Siamak Harandi
(74) *Attorney, Agent, or Firm* — Nixon & Vanderhye, PC

(57) ABSTRACT

The invention concerns an antifraud device (100) for validating the use of a real part of a body as an imprint-bearing substrate (150) and comprising:
  a control unit (106),
  a sensor (102) intended to capture the image of an imprint carried by the substrate (150) placed on said sensor (102),
  a movement module (104) on which said sensor (102) is mounted and which is intended to move said sensor (102),
  an analysis module (108) intended to receive the data representing an image of an imprint captured before the movement of said sensor (102) and an image of an imprint (200) captured after the movement of said sensor (102) and to analyze them, and
  a decision-making module (110) intended to make a decision as to whether or not the substrate (150) is a real part of a body, from information transmitted by the analysis module (108).

6 Claims, 2 Drawing Sheets

(56) References Cited

OTHER PUBLICATIONS

Figure 1:
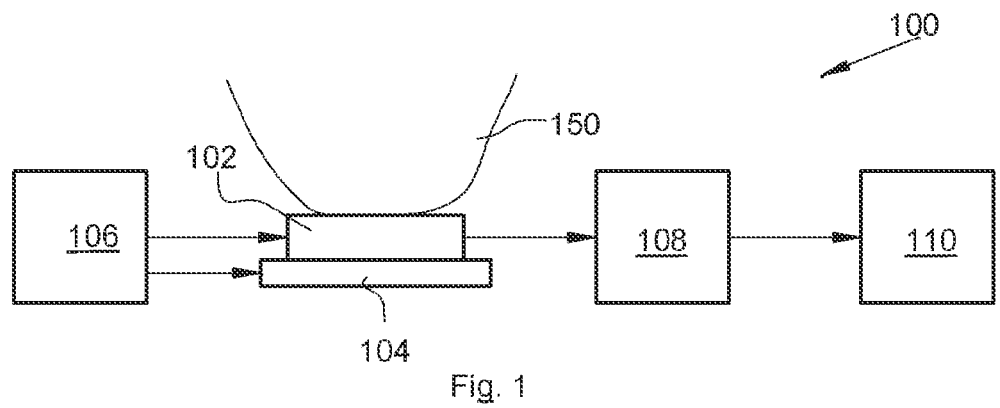

International Search Report for PCT/EP2012/070973, mailed Nov. 30, 2012.
Written Opinion of the International Searching Authority for PCT/EP2012/070973, mailed Nov. 30, 2012.
Antonelli, A. et al., "Fake Finger Detection by Skin Distortion Analysis", IEEE Transactions on Information Forensics and Security, vol. 1, No. 3, (Sep. 1, 2006), pp. 360-373.
Jia, J. et al., "A New Approach to Fake Finger Detection Based on Skin Elasticity Analysis", Biometrics, (Aug. 27, 2007), pp. 309-318.
Maltoni, D. et al., "Handbook of Fingerprint Recognition, Liveness Detection Techniques", Handbook of Fingerprint Recognition, pp. 386-391.

* cited by examiner

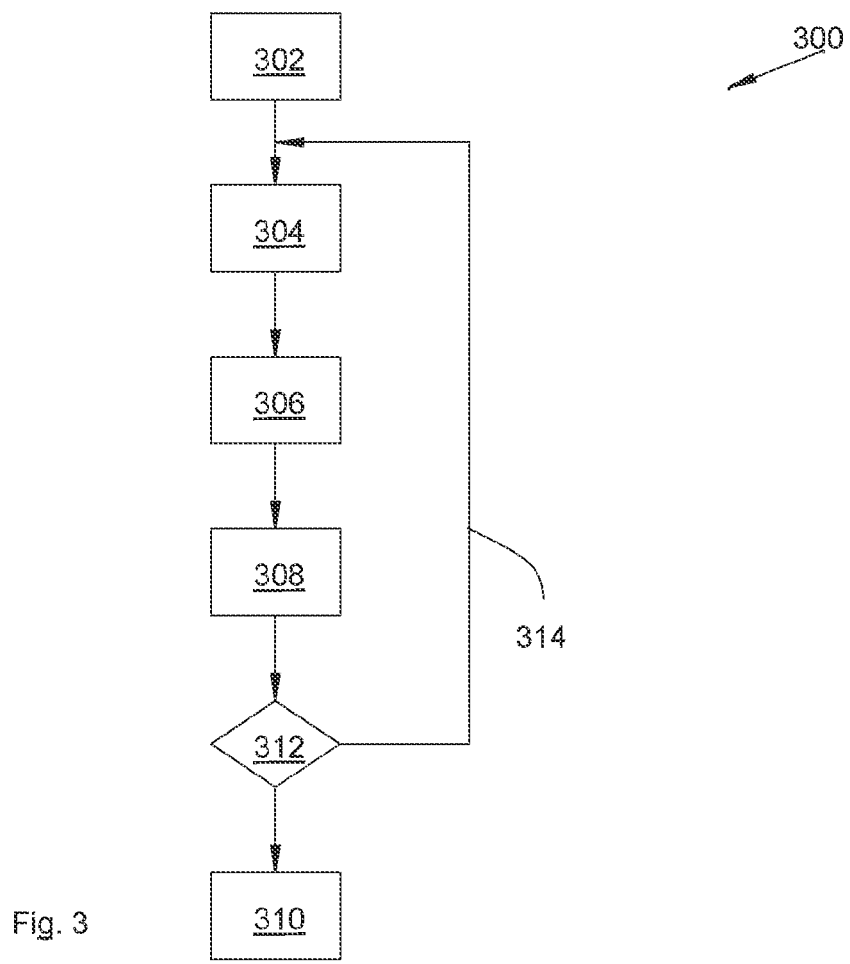
Fig. 3
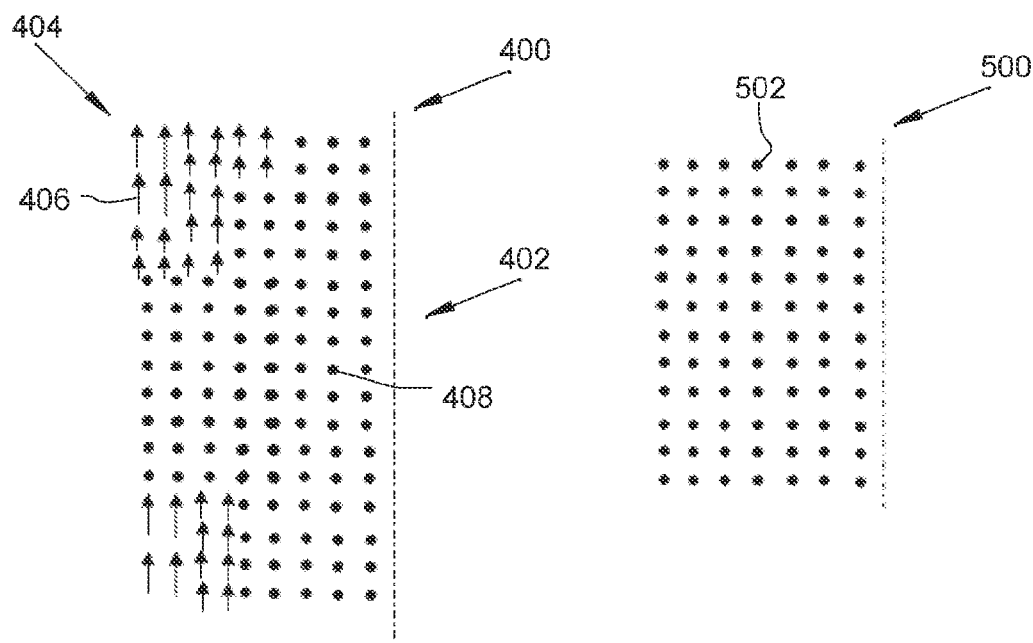
Fig. 4
Fig. 5

ANTI-FRAUD DEVICE

This application is the U.S. national phase of International Application No. PCT/EP2012/070973, filed 23 Oct. 2012, which designated the U.S. and claims priority to FR 11/59678 filed 25 Oct. 2011, the entire contents of each of which are hereby incorporated by reference.

The present invention concerns an antifraud device for validating the use of a real part of a body as an imprint-bearing substrate, as well as a method for validating the use of a real part of a body as an imprint-bearing substrate used in such an antifraud device.

A device for identifying an individual by his imprint, in particular his fingerprint, consists of a sensor intended to capture an image of said imprint, and a comparison means intended to compare this image with images in a database collecting together the images of the imprints of persons liable to be identified by the identification device, and a decision-making means intended to make a decision as to the identification of an individual from the result of the comparisons.

Some ill-intentioned individuals attempt to be identified fraudulently by using decoys in order to lead the identification device into error.

Conventionally three types of fraud are identified:
fraud printed on paper and optically coupling with sensor with water, which consists of reproducing the image of an imprint on a paper,
thick fraud, which consists of reproducing an imprint on a block of silicone, and
thin fraud, which consists of reproducing an imprint on a thin film, for example of the latex type, which is then stuck on a finger.

In order to detect such fraudulent use, the use is known of deforming the finger on the sensor in order to check whether it does indeed correspond to skin, the elasticity characteristics of which are different of those of the materials for producing the decoys.

In particular, turning the finger over the sensor in order to cause a distortion of the image is known, which makes it possible to analyse the elasticity of the skin or the material supporting the fraud.

However, such a method is not very ergonomic since such a movement must be explained to the individual wishing to be identified, which cannot be envisaged, for example, in the case of an identification device that is not supervised.

One purpose of the present invention is to propose an antifraud device for validating the use of a real part of a body as an imprint-bearing substrate that does not have the drawbacks of the prior art and which, in particular, is very ergonomical for the individual.

To this end an antifraud device is proposed for validating the use of a real part of a body as an imprint-bearing substrate and comprising:
a control unit,
a sensor intended to capture the image of an imprint carried by the substrate placed on said sensor,
a movement module on which said sensor is mounted and which is intended to move said sensor,
an analysis module intended to receive the data representing an image of an imprint captured before the movement of said sensor and an image of an imprint captured after the movement of said sensor and to analyse them, and
a decision-making module intended to make a decision as to whether or not the substrate is a real part of a body, from information transmitted by the analysis module.

Advantageously, the analysis module is intended to construct a map of local modification of the ridges frequencies on the imprint from data representing the two images of imprints, and a map of local movement of structures of the imprint from the data representing the two imprint images, and to compare the structure of each map with the structure of reference maps.

Advantageously, when said part of the body is a finger, the movement module is designed to create a translation parallel to the longitudinal axis of the finger when it is placed on the sensor.

The invention also proposes a validation method for validating the use of a real part of a body as a substrate carrying an imprint by means of a validation device comprising a sensor intended to capture the image of an imprint, said validation method comprising:
an initial capture step during which a first image of the imprint is captured by said sensor,
a movement step during which said sensor is moved,
a capture step during which a second image of the imprint is captured by said sensor,
an analysis step during which data representing the two imprint images thus captured are analysed, and
a decision-making step during which a decision is made as to the validity of the substrate according to the results of the analysis step.

Advantageously, the analysis step consists of constructing a map of local modification of the ridges frequencies of the imprint from data representing the two imprint images, and a map of local movement of structures of the imprint from the data representing the two imprint images, and comparing the structure of each map with the structure of reference maps.

Advantageously, the validation method comprises, between the analysis step and the decision-making step, a test step during which it is checked whether a new movement of the sensor must be made, and the validation method comprises a looping step that loops the test step to the movement step in the positive case.

Figure 2:
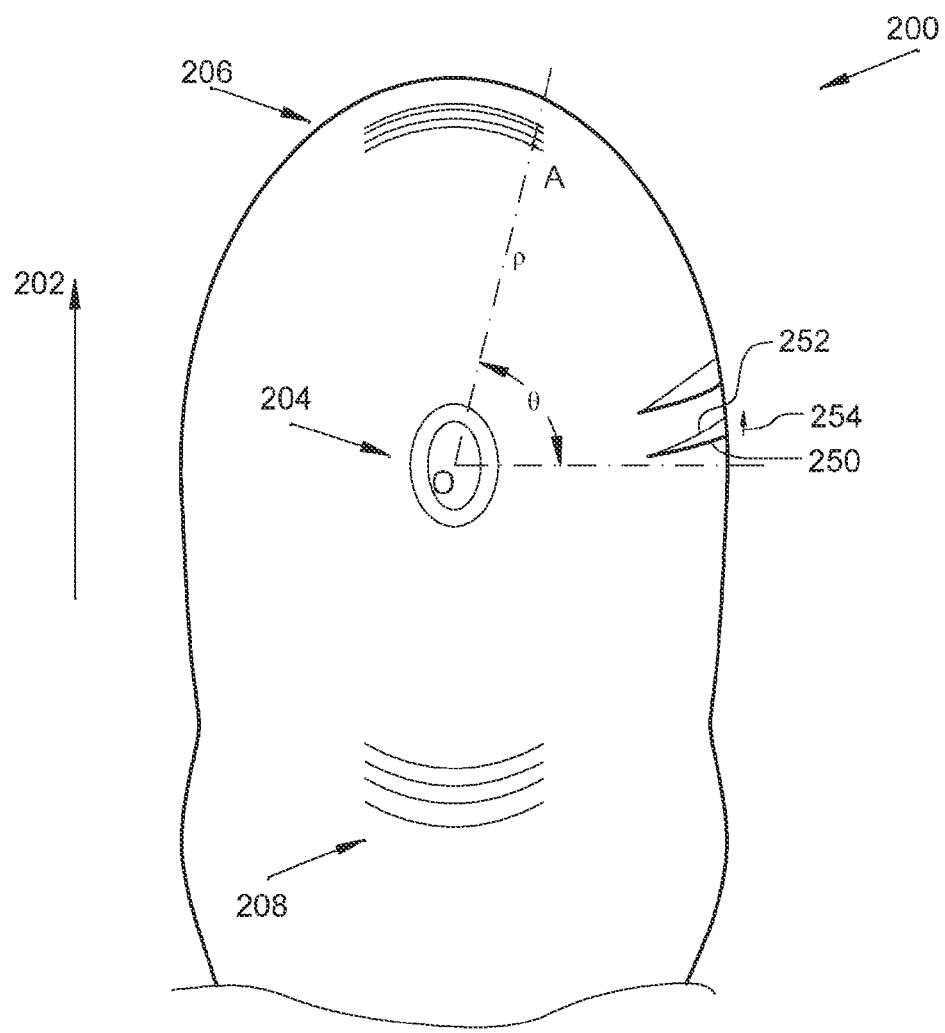

The features of the invention mentioned above, as well as others, will emerge more clearly from a reading of the following description of an example embodiment, said description being given in relation to the accompanying drawings, among which:

FIG. 1 is a schematic representation of an antifraud device for validating the use of a real part of a body as an imprint-bearing substrate of an individual according the invention, FIG. 2 is a schematic representation of the image of a finger deformed by the detection device, FIG. 3 is an algorithm of the method for validating the use of a real part of a body as an imprint-bearing substrate of an individual according to the invention, FIG. 4 shows a half-map of an optical stream corresponding to a real finger, and FIG. 5 shows a half-map of an optical stream corresponding to a paper fraud.

In the following description, the invention is more particularly described in the case where the part of the body is a finger, but it applies in the same way to all other parts of the body bearing an imprint.

FIG. 1 shows an antifraud device 100 that is intended to validate the use of a real finger carrying an imprint of an individual.

The antifraud device 100 comprises:
a control unit 106 designed to control the other elements of the antifraud device 100,
a sensor 102 intended to capture the image of an imprint carried by a substrate 150 placed on said sensor 102, an analysis module 108 intended to receive data representing images of imprints captured and to analyse them as described below, and a decision-making module 110 intended to make a decision as to whether the substrate 150 bearing the fingerprint is a real finger or a false finger, from the information transmitted by the analysis module 108 following its analysis.

The antifraud device 100 also comprises a movement module 104 controlled by said control unit 106, on which said sensor 102 is mounted and which is intended to move said sensor 102.

The analysis module 108 is thus more particularly intended to receive the data representing an imprint image captured before the movement of the sensor 102 and an imprint image captured after the movement of the sensor 102 and to analyse them.

The general principle of the invention thus consists of capturing an image of the imprint of the substrate 150, moving the sensor 102 by means of the movement module 104, which causes a deformation of the substrate 150 and of the imprint that it carries, and then, when the sensor 102 is at rest, capturing a new image of the imprint thus deformed, analysing the two images thus captured in order to derive therefrom data representing the material constituting said substrate 150, and validating the substrate 150 according to the values of the representative data thus derived.

Naturally it is possible to effect several successive movements for each of which a capture of the image of the imprint is effected. The analysis will then relate to the various images thus captured.

The fact that it is the sensor 102 that is moving makes it possible to obtain an antifraud device 100 that is more ergonomic since it is no longer necessary to inform the individuals liable to be identified.

The antifraud device IOU may be coupled to an identification device that captures an image of the imprint of the substrate 150 by means of a sensor 102 in order to compare it with images in a database.

The sensor 102 has a support surface on which the substrate 150 comes into abutment.

The movement undergone by the sensor 102 under the effect of the movement module 104 takes place in a plane parallel to the plane of the support surface.

The movement undergone by the sensor 102 may be a simple movement, that is to say a translation or a rotation, or a complex movement consisting of a combination of simple movements.

In the case of a translation and for ergonomic reasons, the length of movement is of a millimetric order and preferentially less than 2 mm. The stop time between two movements depends on the acquisition speed of the sensor 102.

In the case of a finger, the latter is positioned preferentially on the sensor 102 and the movement module 104 is designed to create a translation parallel to the longitudinal axis of the finger when it is placed on the sensor 102. This is because, as the bone of the phalanx does not extend as far as the end of the finger, the mechanical conditions vary between the two ends of the movement and the deformations obtained are more characteristic of a real finger, whereas in the case of the use of a decoy this decoy does not exhibit such mechanical characteristics since it is homogeneous.

The movement module 104 may be any suitable device such as for example a piezoelectric vibrator.

FIG. 2 is a schematic representation of the image of an imprint 200 of the substrate 150 that has undergone deformation following a rectilinear movement of the sensor 102 in a movement direction 202.

In the embodiment of the invention proposed here, reference areas corresponding to a zero optical stream for each imprint image 200 captured are defined.

The centre of gravity of the reference areas thus defined is determined and constitutes a point "O" constituting the pressure centre and serving as an origin for a system of polar coordinates ($\rho$, $\theta$). Thus a point A is characterised on the imprint image 200 by a pair ($\rho$, $\theta$).

The face of the substrate 150 that is placed on the sensor 102 has ridges that form the imprints. These ridges are distributed over the entire face of the substrate 150. A central area can be seen where central ridges 204 are located, and peripheral areas where peripheral ridges are located, which are here distal ridges 206 and proximal ridges 208.

The central area corresponds to the pressure area through which the substrate 150 is in abutment on the sensor 102, that is to say around the pressure centre "O". The central ridges 204 are slightly deformed by the movement of the sensor 102 since, because of the pressure that is exerted on them, they remain stuck to the sensor 102.

In the embodiment of the invention presented here, there are two peripheral areas, namely an upstream area that is situated upstream of the pressure centre O with respect to the direction of movement 202 of the sensor 102, that is to say here where the proximal ridges 208 are, and a downstream area that is situated downstream of the pressure sensor O with respect to the direction of movement 202 of the sensor 102, that is to say here where the distal ridges 206 are.

The distal ridges 206 that are situated at the end of the substrate 150 and potentially at the end of the phalanx bone in the case of a real finger, and the proximal ridges 208 that are situated at the base of the substrate 105, are deformed by movement of the sensor 102.

In the embodiment of the invention where the direction of movement of the sensor 102 is oriented from the proximal ridges 208 towards the distal ridges 208, the distal ridges 206 move closer together, which causes an increase in the frequency of the distal ridges 206, and the proximal ridges 208 separate, which causes a reduction in the frequency of the proximal ridges 208.

At the same time, the ridges move because of the movement of the sensor 102. The reference 250 indicates a ridge before the movement of the sensor 102 and the reference 252 indicates the same ridge after the movement of the sensor 102.

Analysis of the representative data consists of constructing, from these, a map of local modification of the frequencies of ridges 206 and 208, and a local movement map of the structures 250, 252 of the imprint in contact with the sensor 102, and comparing the structure of each map with the structure of reference maps stored in a reference database.

Analysis of the map of local modification of the frequencies of ridges 204, 206 and 208 consists of analysing, between two images, the variation in the frequencies of ridges 204, 206 and 208 on at least some parts of the imprint image 200, and in particular on the central area, and of at least one peripheral area with respect to the pressure centre O.

In the embodiment of the invention presented here and in the case of a real finger, the frequency of the central ridges 204 does not vary because of the movement of the sensor 102, while the frequency of the distal ridges 206 increases and the frequency of the proximal ridges 208 decreases with the movement of the sensor 102.

In other words, for a real finger, the frequency of the central ridges 204 around the pressure centre O does not vary with the movement of the sensor 102, while the frequencies of peripheral ridges, here proximal and distal, vary with the movement of the sensor 102, either by decreasing or by increasing.

In order to construct the map of local modification of the ridge frequencies, a plurality of points A(ρ, θ) is observed between at least two images of imprints 200 respectively of order i and j, and the variation in ridges frequencies between the images of imprints 200 i and j at the point A(ρ, θ) is given by the formula:

$$\Delta f = \frac{freq(\rho, \theta, i) - freq(\rho, \theta, j)}{freq(\rho, \theta, i)}. \qquad (1)$$

The map of local modification of the ridges frequencies may thus be constructed for a multitude of points A(ρ, θ) distributed over the image of the imprint 200. The distribution and the amplitude of the values of Δf then make it possible to validate or not the fact that the substrate 150 is a real finger.

Analysis of the map of local movement of the structures 250, 252 of the imprint of the substrate 150 in contact with the sensor 102 consists of locating characteristic points 250, 252 on the image of the imprint 200, such as for example pores, ends of scars, bifurcations, or ends of lines, and analysing the movement undergone by each of them under the effect of the movement of the sensor 102. In particular, the central area is not moved while the peripheral areas are moved significantly.

For each characteristic point 250, 252 thus located, a movement vector 254 can thus be constructed between the characteristic point 250 located before the movement of the sensor 102 and the characteristic point 252 located after the movement of the sensor 102.

The local movement maps are thus constructed by monitoring a plurality of characteristic points distributed over the image of the imprint 200 and by a determination of the movement vector 254 of each of them, and to do this an optical stream calculation is used, optionally with a local filtering in order to limit the number of aberrant points.

The distribution, direction and amplitude of the movement vectors 254 then make it possible to validate or not whether the substrate 150 is a real finger.

FIG. 4 shows the half-map 400 of the optical stream obtained for a real finger. The central area 402 in contact with the support surface of the sensor 102 is very slightly moved, which is shown by dots 408, while the peripheral areas 404 that are not in contact with the support surface of the sensor 102 have greater movement shown here by arrows 406.

In the case of a paper fraud, the substrate 150 is not elastic and there is therefore no variation in frequency of the ridges and, as there is no deformation of the substrate 150, all the characteristic points undergo the same movement. Depending on whether the substrate slides over the support surface of the sensor 102 or does not slide over the support surface of the sensor 102, different results are obtained.

If the support slides, the movements of the characteristic points that are on the substrate correspond to the movement of the sensor 102.

The map of local modification of the ridge frequencies is then a set of "zeros" distributed over the image of the imprint 200 and the local movement is a set of movement vectors 254 that are all identical to the movement vector of the sensor 102.

If the support does not slide, it is the element that is behind the substrate, generally the finger of the fraudster, that absorbs the movement of the sensor 102, and there is therefore no movement of the characteristic points that are on the substrate.

FIG. 5 shows the half-map 500 of the optical stream obtained for a paper fraud that does not slide. The entire image remains stationary despite the movement of the sensor 102, which is shown by the dots 502.

In the case of a thick fraud, the substrate 150 behaves practically like paper except at the periphery of the pressure area. The maps are therefore similar to those of the paper fraud, or slightly different at the periphery but not sufficiently to determine that the substrate 150 is a real finger, for example because of a difference in flexibility between the skin and silicone and/or because of a difference between the homogeneous structure of the decoy and the non-homogeneous structure of the finger.

In the case of a thin fraud, the bonding area between the thin layer and the finger gives rise to results different from those obtained with a real finger. These differences are visible on the maps.

The maps are centred on the origin O of the system of polar coordinates and the resolution of the maps is different from that of the images of imprints 200, for example a resolution of 50 dpi is chosen but other resolutions are possible.

In the cases where some characteristic points are not visible on all the images of imprints 200, the information necessary for constructing the maps, namely the Δf and the corresponding movement vectors 254 are set to "zero" so that all the maps have the same dimension. Thus the maps are seen as vectors all having the same dimension.

In the embodiment of the invention presented above, the maps are constructed more particularly by means of two images of imprints 200 captured successively, but it is possible, for a type of map, to group together the analyses of all the pairs of images of imprints 200 captured, in the same map, in order to obtain average values Δf and movement vectors 254.

The analysis and the decision making on the fact that the substrate 150 is a real finger or a false finger may be entrusted to a classifier with the role of classifying, in one class among several, a sample that has properties similar to said class.

The use of a classifier requires a learning mechanism during which a reference database containing examples of maps of real fingers and frauds distributed in classes is created.

The classifier may be of the SVM or multiclass SVM type, or be of the type performing a principal component analysis (PCA) followed by a linear discriminant analysis (LDA).

When a substrate 150 is to be validated, a first image 200 of the imprint carried by the substrate 150 is captured, a movement of the sensor 102 is made, and a second image of an imprint 200 is captured. As explained above, it is possible to make other movements of the sensor 102 and to capture an imprint image after each movement.

The local modification map of the ridges frequencies and the local movement map are then established and transmitted to the input of the classifier.

The number of classes varies from 2 for "real finger" and "fraud" to 4 for "real finger", "paper fraud", "thick fraud" and "thin fraud".

It is also possible act in steps by performing a first classification and then a second classification.

The first classification consists of classifying the samples in the "paper fraud" class or an "other" class by means of a first two-class classifier. This first classification quickly eliminates paper frauds, which are the easiest to distinguish.

The second classification consists of classifying the samples in the "other" class in the "real finger" or in a "fraud" class thus containing thick trauds and thin trauds.

FIG. 3 shows an algorithm of a validation method 300 for validating the fact that the substrate 150 is a real finger.

The validation method 300 comprises:
- a initial capture step 302 during which a first imprint image 200 is captured,
- a movement step 304 during which the sensor 102 is moved,
- a capture step 306 during which a second imprint image 200 is captured,
- an analysis step 308 during which data representing the two imprint images thus captured are analysed, and
- a decision-making step 310 during which a decision is made as to the validity of the substrate 150 according to the results of the analysis step.

When several movements of the sensor 102 are performed, the analysis step 308 loops onto the movement step 304 as long as a movement of the sensor 102 is to be performed. To this end, the validation method 300 comprises, between the analysis step 308 and the decision-making step 310, a test step 312 during which a verification of the existence of a new movement of the sensor 102 is made. In the event of a negative response, the process continues after the decision-making step 310. In the case of a positive response, the process loops onto the movement step 304. To this end, the validation method 300 comprises a looping step 314 that loops the test step 312 to the movement step 304. The decision-making step 310 is then based on the results of the various analysis steps 308.

The analysis step 308 consists of constructing the local modification map of the ridge frequencies, and the local movement map of the structures from the data representing the images of imprints 200 of each pair of images of imprints 200 captured and comparing the structure of each map with the structure of reference maps stored in the reference database, for example by means of a classifier.

The decision-making step 310 consists of validating or not the presence of a real finger according to the results of the analysis step 308.

Naturally the present invention is not limited to the examples and embodiments described and depicted but is capable of numerous variants accessible to persons skilled in the art.

For example the invention has been particularly described in the case of a substrate consisting of a finger, but it is possible to apply the invention in the case of a substrate consisting of four fingers. It is then possible to construct for each finger a local modification map of the ridge frequencies and a local movement map of the structures, but it is also possible to construct a single local modification map of the ridge frequencies and a single local movement map of the structures from all the representative data. In the latter case, the maps represent the averages issuing from the representative data.

The invention claimed is:

1. Antifraud device (100) for validating a use of a real part of a body as an imprint-bearing substrate (150) and comprising:
   - a control unit (106) configured to control other elements of the antifraud device (100),
   - a sensor (102) configured to capture an image of an imprint carried by the substrate (150) placed on said sensor (102),
   - a movement module (104), on which said sensor (102) is mounted, configured to apply pre-defined movement to said sensor (102),
   - an analysis module (108) configured to receive data representing an image of an imprint (200) captured before a movement of said sensor (102) and an image of an imprint (200) captured after the movement of said sensor (102) and to analyse them, and,
   - a decision-making module (110) configured to make a decision as to whether or not the substrate (150) is a real part of a body, from information transmitted by the analysis module (108).

2. Antifraud device (100) according to claim 1, characterised in that the analysis module (108) is configured to construct a map of local modification of ridges (206, 208) frequencies on the imprint from data representing the two images of imprints (200), and a map of local movement of structures (250, 252) of the imprint from the data representing the two imprint images (200), and to compare the structure of each map with the structure of reference maps.

3. Antifraud device (100) according to claim 1, characterised in that, when said part of the body is a finger, the movement module (104) is designed to create a translation parallel to the longitudinal axis of the finger when it is placed on the sensor (102).

4. Validation method (300) for validating a use of a real part of a body as a substrate (150) carrying an imprint by means of a validation device (100) comprising a sensor (102) intended to capture an image of the imprint, said validation method (300) comprising:
   - an initial capture step (302) during which a first image of the imprint (200) is captured by said sensor (102),
   - a movement step (304) during which a pre-defined movement is applied to said sensor (102),
   - a capture step (306) during which a second image of the imprint (200) is captured by said sensor (102),
   - an analysis step (308) during which data representing the two imprint images (200) thus captured are analysed, and
   - a decision-making step (310) during which a decision is made as to the validity of the substrate (150) according to the results of the analysis step.

5. Validation method (300) according to claim 4, characterised in that the analysis step consists of constructing a map of local modification of the ridges (206, 208) frequencies of the imprint from data representing the two imprint images (200), and a map of local movement of structures (250, 252) of the imprint from the data representing the two imprint images (200), and comparing the structure of each map with the structure of reference maps.

6. Validation method (300) according to claim 4, characterised in that it comprises, between the analysis step (308) and the decision-making step (310), a test step (312) during which it is checked whether a new movement of the sensor (102) must be made, and in that it comprises a looping step (314) that loops the test step (312) to the movement step (304) when a new movement of the sensor (102) must be made.

* * * * *